United States Patent [19]

Rieder et al.

[11] Patent Number: 4,550,505

[45] Date of Patent: Nov. 5, 1985

[54] INSTRUMENT FOR MEASURING LENGTHS

[76] Inventors: Heinz Rieder, Riedersbach 90, A-5120 St. Pantaleon; Max Schwaiger, A-5121 Ostermiething No. 298, both of Austria

[21] Appl. No.: 669,608

[22] Filed: Nov. 8, 1984

[30] Foreign Application Priority Data

Nov. 22, 1983 [AT] Austria .................. 4087/83

[51] Int. Cl.[4] .............................................. G01B 11/04
[52] U.S. Cl. ............................... 33/125 C; 250/237 G
[58] Field of Search ............. 33/125 R, 125 A, 125 C, 33/125 T; 250/237 G

[56] References Cited

U.S. PATENT DOCUMENTS

| | | | |
|---|---|---|---|
| 4,031,595 | 6/1977 | Welker | 33/125 C |
| 4,095,903 | 6/1978 | Feichtinger | 33/125 C |
| 4,152,837 | 5/1979 | Nelle et al. | 33/125 C |
| 4,170,828 | 10/1979 | Ernst | 33/125 C |
| 4,170,829 | 10/1979 | Nelle | 33/125 C |
| 4,262,423 | 4/1981 | Affa | 33/125 A |
| 4,400,880 | 8/1983 | Nelle | 33/125 C |
| 4,475,289 | 10/1984 | Nelle | 33/125 C |
| 4,512,082 | 4/1985 | Burkhardt | 33/125 C |

FOREIGN PATENT DOCUMENTS 2349944 4/1974 Fed. Rep. of Germany .
2510219 9/1976 Fed. Rep. of Germany .
3208591 9/1983 Fed. Rep. of Germany .
3210962 10/1983 Fed. Rep. of Germany .

Primary Examiner—Richard R. Stearns
Attorney, Agent, or Firm—Karl F. Ross; Herbert Dubno

[57] ABSTRACT

The instrument for measuring lengths comprises a carrier, a rule secured to that carrier and provided with a scale, and an optoelectronic scanning unit comprising a scanning plate, light emitters and light receivers. The scanning unit is movable along the scale by means of an actuating member, which constitutes a feeler. Auxiliary tracks are provided for guiding the scanning unit along the scale. A part of the scanning unit is connected to the actuating member by means which are yieldable transversely to the longitudinal direction of the scale. Auxiliary tracks are provided for guiding a part of the scanning unit along the scale. The overall structure is simplified and reduced in overall size and a change of the clearance between the scanning plate and the rule is prevented in that only the scanning plate is guided in engagement with the auxiliary tracks, one of which is constituted by the rule. The light emitters and the light receivers of the scanning unit are secured to the actuating member, which is connected to the scanning plate by means which are yieldable transversely to the longitudinal direction of the scale.

6 Claims, 2 Drawing Figures

INSTRUMENT FOR MEASURING LENGTHS

BACKGROUND OF THE INVENTION

1. Field of the Invention

This invention relates to an instrument for measuring lengths, particularly to a sealed instrument for measuring lengths, comprising a carrier, a rule mounted on said carrier and provided with a scale, and an optoelectronic scanning unit which is movable along said scale and comprises a scanning plate, light emitters and light receivers, also comprising an actuating member, which constitutes a feeler and is operable to move said scanning unit along said scale and is connected to a part of the scanning unit by means which are yieldable transversely to the longitudinal direction of the scale, and auxiliary tracks for guiding a part of the scanning unit along the scale.

2. Description of the Prior Art

Such instruments are known from Laid-open German Applications Nos. 23 49 944 and 25 10 219. The measurement is to be taken in the longitudinal direction of the scale so that errors which would be due to a transverse deviation of the feeler, which may be coupled, e.g., to a spindle of a machine tool, will be precluded and a disengagement of the scanning plate from the rule or a change of the distance between the scanning plate and the rule will also be precluded. In the known instruments for measuring lengths the scanning plate, the light emitters and the light receivers are assembled in the scanning unit to form a rigid unit, which in most cases is accommodated in a separate housing, and the feeler is connected to that unit by means which are yieldable transversely to the longitudinal direction of the scale. Said connecting means comprises pressure-applying springs, which urge sliders or rollers carried by the scanning unit against the auxiliary tracks, which in most cases consist of two guiding surfaces which are at right angles to each other. If one of said auxiliary tracks is constituted by the rule, the sliders or rollers must be provided on the scanning unit at a relatively large distance from the scanning plate. For this reason an exact guidance of the entire scanning unit rather than only of the scanning plate relative to the scale is ensured and the rule must have a relatively large width so that it can be formed with proper guiding surfaces. The scanning unit, which is relatively movably supported on the feeler, has a relatively heavy weight so that relatively strong springs are required to ensure that the sliders or rollers of the scanning unit will reliably remain in engagement with the auxiliary tracks even when vibrations or shocks occur, which are inevitable when the instrument for measuring lengths is mounted on a machine tool. As a result, strong pressure forces are exerted on said auxiliary tracks. Another important disadvantage of the known measuring instruments of the present kind resides in that the leads connected to the light emitters and to the light receivers must also be laid so as to permit transverse movements of the scanning unit relative to the coupling member. Said light receivers are often provided on printed circuit boards, which are also provided with amplifiers or with other signal-processing means.

In order to accomplish other objects, namely, to permit a correction of a measurement, e.g., for a compensation of pitch errors of the scale, by a movement of the scanning unit relative to the actuating member, it is known to mount the scanning unit so that it can be adjusted relative to the actuating member in the longitudinal direction of the scale or can be tilted relative thereto and to provide a correcting track, which in most cases constitutes a correcting template, which has been designed as a result of a control measurement performed with a higher-ranking measuring system and is scanned by means of a feeler by which the scanning unit is correspondingly advanced or retracted or pivotally moved. Such designs are known from Laid-open German Applications Nos. 32 08 591 and 32 10 962. Laid-open German Application No. 32 10 962 discloses an embodiment which provides for a pivotal movement and in which only the scanning plate is pivotally moved whereas the remaining parts of the scanning unit are guides along the scale regardless of the pivotal movement. If it is desired in that case that the scanning unit should move along the scale, the entire scanning unit must be guided in the manner described first hereinbefore and must be connected to the feeler in the manner described hereinbefore. A tilting adjustment of the scanning plate will only be possible if that scanning plate is spaced a relatively large distance from the rule. That distance will change during a tilting movement at least adjacent to certain gratings so that signal distortion will occur and must be compensated. If a measuring movement along the scale is to be ensured, the overall structure will be even more expensive than the measuring instrument of the kind described first hereinbefore and all disadvantages of the latter instruments will be encountered. The same disadvantages will be encountered in the use of the structure disclosed in Laid-open German Application No. 32 08 591. In that embodiment the scanning plate is connected to springs, which constitute a parallel crank linkage and constrain the scanning plate to move parallel to itself relative to the remaining parts of the scanning unit. The adjustment of the scanning plate is again effected by a feeler, which scans a template. Alternatively, the adjustment may be effected by piezoelectric means under the control of suitable signals. It might be contemplated to guide the scanning unit in such a manner that it will necessarily move along the scale—although that concept has not been disclosed. But even in that case the longitudinal adjustment of the scanning plate relative to the scale may change the distance from that plate to the scale so that a larger distance from the scanning plate to the rule must be maintained.

SUMMARY OF THE INVENTION

It is an object of the invention to simplify the overall structure of an instrument of the kind described first for measuring lengths and to increase the life of the instrument and its reliability.

This object is accomplished in that the scanning plate is guided by the auxiliary tracks, one of which is constituted by the rule, the light emitters and the light receivers of the scanning unit are rigidly secured to the actuating member, and the connecting means which are yieldable transversely to the longitudinal direction of the scale provide a connection between the actuating member and the scanning plate.

The invention is based on the recognition that an exact guidance of the scanning plate alone relative to the scale will be particularly important if a predetermined clearance between the scanning plate and the rule is reliably maintained or a lifting of the scanning plate from the rule is to be reliably prevented and the scanning plate is to be constrained to move exactly in the longitudinal direction of the scale. The light emitters and the light receivers are moved in unison with the feeler and their movements relative to the scale transversely to the longitudinal direction thereof are relatively small and do not change the system so as to introduce an error into the result of the measurement. If an incremental scale is scanned in practice by means of a scanning plate comprising a plurality of gratings which are spaced apart along the scale and are offset from adjacent increments of the scale by different fractions of an increment of the scale, and respective light receivers and separate or common light-emitting means are associated with said gratings, the changes of the signal amplitude or of the d.c. component of the outputs of the light receivers can easily be compensated. Said signals are in most cases sinusoidal and displaced in phase relative to each other. The light receivers and the light-emitting means as well as the leads connected to them may be rigidly mounted on a substrate which constitutes a part of the feeler. Only the scanning plate, which is relatively light in weight, is guided on the auxiliary track along the scale so that small contact pressure forces will be sufficient. Simple designs may be adopted for the pressure-applying means and the guiding means associated with the scanning plate. Because the scanning plate is guided on the rule, the clearance between said plate and the rule will remain constant, the rule may be narrower than in the known designs and the required reliability in operation will be ensured. Within the scope of the basic concept it is possible to perform corrections in that a longitudinal adjustment of the scanning plate relative to the remaining parts of the scanning unit is effected by a feeler which is moved to scan a template. Even in that case a constant clearance between the scanning plate and the rule will be maintained and the scale will be scanned in its longitudinal direction.

The auxiliary tracks may be constituted by the rule and by a sliding surface, which is provided on the carrier and extends normal to the rule and is constituted by a tensioned metal strip, the configuration of which is adjustable by spaced apart adjusting screws mounted in the carrier.

In a simple embodiment the scanning plate is provided with sliders, which support the scanning plate on the rule and on the sliding surface, and the scanning plate is connected to the remaining parts of the scanning unit by a common compression spring, which acts in an osculating plane of the angle that is included by the guiding surfaces. In that case a single spring holds the sliders of the scanning plate in engagement with both guiding surfaces.

DESCRIPTION OF THE PREFERRED EMBODIMENT

Figure 1:
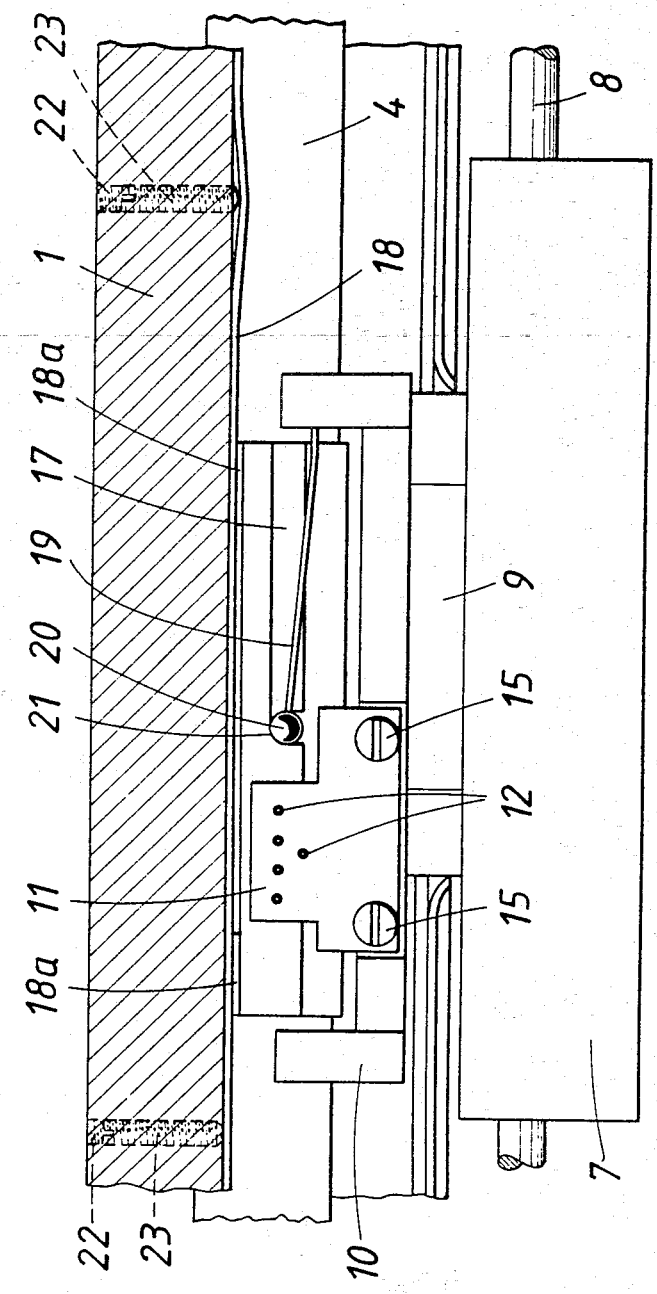
FIG. 1 shows an instrument for measuring lengths with its carrier shown in longitudinal section.
Figure 2:
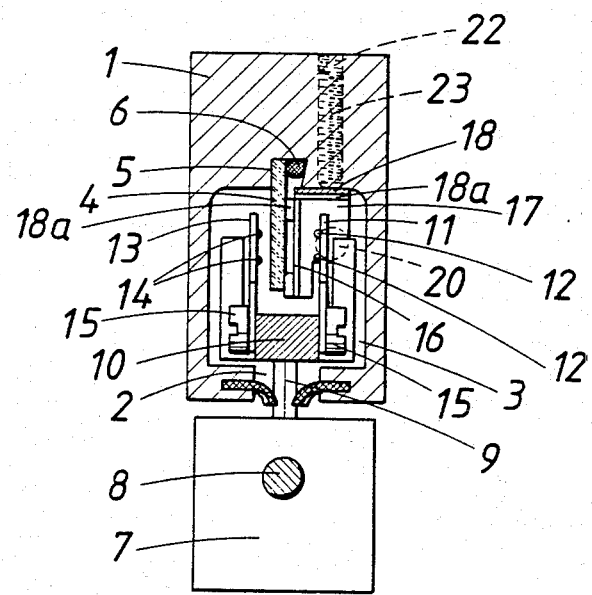
FIG. 2 shows the instrument of FIG. 1 with its carrier shown in transverse section.

An illustrative embodiment of the invention is shown on the drawing.

The instrument for measuring lengths comprises a carrier 1, which consists of an extruded tubular section, which is rectangular in cross-section and in its bottom is formed with a slot 2. The top wall of the tube 1 is much thicker than its other walls to ensure the required stiffness. In the present embodiment a glass rule 4 is disposed in the cavity 3 of the carrier 1 and is secured to the latter in that one edge of the rule 4 has been inserted into a groove 5 formed in the top wall of the tube 1 and held in position in said groove by an elastic strip 6, or a clamping element. The main part of the rule 4 protrudes into the cavity 3 and is provided with a scale, e.g., with an incremental scale consisting of a bar pattern.

A feeler is associated with the object to be measured and comprises an actuating or coupling member 7, which may be moved in unison with a toolholder that is guided on a spindle 8 of a machine tool. The feeler also comprises a sword 9, which extends through the slot 2, and a carriage 10, which is accommodated in the cavity 3. The parts 7, 9, and 10 are rigidly connected to each other. In the slot 2, the sword 9 extends between sealing lips, which prevent an ingress of dust, so that the rule 4 and the scanning unit 10 are sealed in the cavity 3.

The carriage 10 carries a printed circuit board 11 provided with light-emitting diodes 12 and a printed circuit board 13 provided with phototransistors 14. Said printed circuit boards are secured to the carriage 12 with screws 15 and are disposed on opposite sides of the rule 4. Each diode 12 is in register with and spaced apart from a transistor 14. The rule 4 and a scanning plate 16 are disposed between the printed circuit boards 11 and 13. The scanning plate 16 comprises scanning fields, which are offset from each other along the rule 4 and are associated with respective diode-transistor pairs 12, 14. Each diode 12 illuminates the associated phototransistor 14 with light which is transmitted through the rule 4 and the associated scanning field of the scanning plate 16. The intensity of illumination of the phototransistors will change with the position of the scanning fields of the scanning plate 16 relative to the rule 4 so that the outputs of the transistors will change in dependence on the intensity of illumination, i.e., on the movement of the carriage 10 relative to the rule 4. These outputs, which are displaced in phase relative to each other, are delivered to evaluating circuitry, which detects from said outputs the direction in which the carriage 10 is moved relative to the rule and which counts the entire signals, e.g., their zero crossings, and/or effects an electronic division of the signals or an interpolating calculation so as to achieve a further division of the scale increments. The outputs which are thus produced, possibly with the aid of a computer, may be displayed as the result of the measurement and/or may be delivered to a unit for controlling the machine.

The scanning plate 16 is provided with plastic sliders 18a, which bear on the confronting surface of the rule 4. The scanning plate 16 is also connected to a bracket 17, which leaves the scanning fields uncovered and is provided on its top with sliders 18a bearing on a steel strip 18, which extends beside the groove 5 and has been inserted into the inside surface of the top of the tube 1. That surface of the rule 4 which faces the scanning plate 16 and the underside of the steel strip 18 constitute guiding surfaces in slidable contact with the sliders 18a of the scanning plate 16. The remaining parts of the scanning unit are accommodated in the carriage 10, which carries a spring 19 that is provided at its free end with a ball 20, which is received by a recess of the bracket 17 without backlash. The spring 19 is prestressed and applies pressure approximately in a diagonal direction toward the line at which the two above-mentioned guiding surfaces intersect. As a result, the spring 19 provided with the ball 20 holds the scanning plate 16 in engagement with the associated guiding members 4, 18.

The carriage 10 and the other parts of the feeler 7, 9, 10 can be adjusted in vertical and lateral directions relative to said guiding members and relative to the direction in which the scanning plate 16 is movable.

The course of the guiding surface constituted by the strip 18 can be exactly determined in that the carrier 1 is formed with spaced apart tapped bores 22, which contain headless adjusting screws 23, which bear on the strip 18.

It will be understood that the illustrative embodiment which has been described hereinbefore can be structurally modified within the scope of the invention. Specifically, the inventive concept may also be applied to scanning units in which the scanning plate, the light emitters and the light receivers are disposed on the same side of the rule and the receivers receive the light that has been reflected by the scale and transmitted through the scanning plate, or the rule may be provided with a reflective coating on the rear and the light receivers and light emitters may be offset from each other transversely to the longitudinal direction of the scale. The guiding surfaces and the actuating member or members may be constituted by elements other than those shown. The scanning plate 16 may be displaceable relative to the carriage 10 in a direction which is transverse to the longitudinal direction of the scale and an adjusting device may be provided for effecting such relative adjustment in response to the scanning of a correcting template.

We claim:

1. In an instrument for measuring lengths, comprising
   a carrier,
   a rule secured to said carrier and provided with a light-modifying scale,
   an optoelectronic scanning unit which is movable along said scale and comprises a plurality of parts, including light-emitting means for emitting light onto said scale, a light-modifying scanning plate for receiving light that has been emitted by said light emitting means onto said scale, and light receivers for receiving light that has been modified by said scale and said scanning plate and for generating changing electric outputs in response to the light thus received as said scanning unit is moved along said scale,
   auxiliary tracks for guiding a part of said scanning unit along said scale,
   an actuating member for moving said scanning unit along said scale, and
   yieldable connecting means which are yieldable transversely to the longitudinal direction of said scale and connect said actuating member to a part of said scanning unit,
   the improvement residing in that
   said rule has a surface which constitutes one of said auxiliary tracks,
   said scanning plate bears on and is guided by said auxiliary tracks,
   said light-emitting means and said light receivers are rigidly secured to said actuating member, and
   said yieldable connecting means connect said actuating member to said scanning plate.

2. The improvement set forth in claim 1, wherein said scale, said auxiliary tracks, said scanning unit and said yieldable connecting means are sealed from the outside.

3. The improvement set forth in claim 1 wherein
   a tensioned metal strip is carried by said carrier,
   a plurality of adjusting screws, which are spaced apart in the longitudinal direction of said scale, are in threaded engagement with said carrier and operable to change the configuration of said metal strip, and
   said strip has a sliding surface which constitutes another one of said auxiliary tracks and is normal to said surface of the rule which constitutes one of said auxiliary tracks.

4. The improvement set forth in claim 3, wherein
   said scale, said auxiliary tracks, said scanning unit and said yieldable connecting means are disposed inside said carrier and sealed from the outside,
   said actuating member is accessible on the outside of said carrier and
   said adjusting screws are accessible on the outside of said carrier.

5. The improvement set forth in claim 3, wherein
   said scanning plate carries sliders in sliding contact with said auxiliary tracks constituted by said rule and said strip,
   said auxiliary tracks include an angle with each other, and
   said yieldable connecting means comprise a compression spring urging said scanning plate toward said auxiliary tracks in the direction of an osculating plane of said angle.

6. The improvement set forth in claim 5, wherein said spring bears on those parts of said scanning unit which are rigidly secured to said actuating member.

* * * * *